UNITED STATES PATENT OFFICE.

EMIL WÖRNER, OF BERLIN, GERMANY, ASSIGNOR TO THE FIRM OF J. D. RIEDEL AKTIENGESELLSCHAFT, OF BERLIN, GERMANY.

MERCURY SALTS OF CHOLIC ACID AND PROCESS OF MAKING SAME.

No. 811,193. Specification of Letters Patent. Patented Jan. 30, 1906.

Application filed June 9, 1905. Serial No. 264,504. (Specimens.)

*To all whom it may concern:*

Be it known that I, EMIL WÖRNER, a subject of the German Emperor, residing at Berlin, Germany, have invented certain new and useful Improvements in Mercury Salts of Cholic Acid and Processes of Making the Same, of which the following is a specification.

It is well known that taurocholic and glycocolic acid, which occur in ox-gall in the shape of their salts, may be split up by boiling wit halkalies, thereby yielding cholic acid, besides taurin and glycocol.

Strecker seems to have been the first to make a close study of cholic acid (*Ann. der Chemie and Pharmocie*, 1848, Vol. 67 page 12,) and has also prepared salts of the same; but hitherto mercury salts of cholic acid have not been known, although Strecker mentions that a three-per-cent. solution of potassium cholate yields with mercury chlorid or a solution of mercurous oxid a white precipitate, which partly dissolves on boiling.

It is not possible to obtain mercury cholate by precipitating mercury chlorid with potassium cholate, because instead of a compact precipitate only a milky turbidity is produced, which cannot be removed by filtration. On the contrary, the entire liquid congeals after a few minutes to a translucent jelly, which enters into solution when diluted with water. The sulfate and nitrate of mercury are also unsuitable, because they easily form basic salts and will decompose if dissolved even in pure water. Consequently they yield precipitates which contain free cholic acid and basic nitrate or sulfate. The presence of these basic compounds renders such preparations unsuitable for therapeutic purposes.

According to the present invention pure mercury salts of cholic acid are obtained by starting from salts which are neutral as far as practicable and less inclined to the formation of basic salts. These requirements are fulfilled by the mercury salts of many organic acids, and especially the acetates, because the small quantity of acetic acid arising from the dissociation of these salts will not precipitate any cholic acid, the latter being soluble in water containing acetic acid. In this manner the mercuric and mercurous salts of cholic acid may be easily produced.

If the five to ten per cent. solution of a cholic salt—for instance, potassium cholate—is introduced into a solution of mercuric acetate or mercurous acetate while rapidly stirring, yellowish-white precipitates are produced, which can be easily filtered, washed, and dried.

The new salt of mercury and cholic acid thus obtained, $C_{24}H_{39}O_5Hg$ or $(C_{24}H_{39}O_5)_2Hg$, is a light yellowish-white powder sparingly soluble or almost insol ble in pure water. If an alkali is poured over it, an oxid of mercury separates out. By alcohol it is decomposed.

The mercurous cholate $(C_{24}H_{39}O_5Hg)$ yields black mercurous oxid when alkalies are poured over it.

The mercuric cholate $(C_{24}H_{39}O_5)_2Hg$ is very sparingly soluble in pure water, but more easily soluble in water containing salts. It is very soluble in sodium-chlorid solutions and potassium-chlorid solutions. Alkalies separate from it yellow mercuric oxid. Alcohol dissolves it while causing decomposition.

The mercury salts of cholic acid are applicable as a remedy for or preventive of gall-stones, inasmuch as the cholic acid promotes the secretion of bile, while the mercury disinfects the bile-ducts and prevents a bacterial infection or removes the same if already existing, and thereby eliminates one of the principal causes of the formation of gall-stones. The cholates of mercury are also valuable as antisyphilitica, which differ from others by their mild action and cause an early disappearance of syphilitic symptoms.

What I claim is—

1. The process for obtaining mercury salts of cholic acid, which consists in treating a suitably-dilute solution of a salt of cholic acid with a mercury salt of an organic acid to form a precipitate, and mechanically separating the latter, substantially as described.

2. The process for obtaining mercury salts of cholic acid, which consists in treating a suitably-dilute solution of a salt of cholic acid with a mercury salt of acetic acid to form a precipitate and mechanically separating the latter, substantially as described.

3. As a new product of manufacture, a mercury salt of cholic acid, having the shape of a light yellowish-white powder sparingly soluble in pure water, yielding an oxid of mercury on the addition of an alkali and undergoing decomposition on the addition of alcohol, substantially as described.

In testimony whereof I have hereunto set my hand in presence of two subscribing witnesses.

EMIL WÖRNER.

Witnesses:
PAUL SIEDLER,
CURT MÜLLER.